(12) United States Patent
Hiegemann

(10) Patent No.: US 6,358,172 B1
(45) Date of Patent: Mar. 19, 2002

(54) DRIVE DEVICE

(76) Inventor: Michael Hiegemann, Oberriedenstrasse 8, CH-5412 Gebenstorf (CH)

( * ) Notice: Subject to any disclaimer, the term of this patent is extended or adjusted under 35 U.S.C. 154(b) by 0 days.

(21) Appl. No.: 09/575,052

(22) Filed: May 19, 2000

Related U.S. Application Data

(63) Continuation of application No. PCT/EP98/07182, filed on Nov. 10, 1998.

(30) Foreign Application Priority Data

Nov. 19, 1997 (DE) .......................... 197 51 231

(51) Int. Cl.[7] ................................................ F16H 3/72
(52) U.S. Cl. .......................................... 475/5; 475/329
(58) Field of Search ............................ 475/5, 329, 341, 475/342

(56) References Cited

U.S. PATENT DOCUMENTS

| | | | | |
|---|---|---|---|---|
| 2,597,357 A | * | 5/1952 | McComick ................ | 475/5 X |
| 3,088,335 A | * | 5/1963 | Bullard ...................... | 475/5 X |
| 3,503,281 A | * | 3/1970 | Gsching et al. ............. | 475/5 X |
| 4,090,416 A | * | 5/1978 | Hicks .......................... | 475/5 |
| 4,233,858 A | * | 11/1980 | Rowlett ....................... | 475/5 |
| 4,269,085 A | * | 5/1981 | Anders et al. .............. | 475/5 X |
| 4,423,794 A | * | 1/1984 | Beck .......................... | 475/5 X |
| 4,939,949 A | * | 7/1990 | Langenberg ................ | 475/5 X |
| 5,080,635 A | * | 1/1992 | Martinez et al. ............. | 475/5 |
| 5,529,566 A | * | 6/1996 | Well ........................... | 494/1 |

FOREIGN PATENT DOCUMENTS

| | | | | |
|---|---|---|---|---|
| GB | 877107 | * | 9/1961 | ................ 475/5 |
| JP | 3244854 | * | 10/1991 | ................ 475/5 |

* cited by examiner

*Primary Examiner*—Charles A. Marmor
*Assistant Examiner*—Ha Ho
(74) *Attorney, Agent, or Firm*—Herbert L. Lerner; Laurence A. Greenberg; Werner H. Stemer

(57) ABSTRACT

A drive device is assigned a main driving machine operating at a constant rotational speed. The drive device can be connected to a working machine with the aid of a variable-ratio gear unit. So that the rotational speed of the working machine can be modified, the drive device has an electronically controlled variable-ratio drive that is connected mechanically to the variable-ratio gear unit.

7 Claims, 5 Drawing Sheets

DRIVE DEVICE

CROSS-REFERENCE TO RELATED APPLICATION

This is a continuation of copending International Application PCT/EP98/07182, filed Nov. 10, 1998, which designated the United States.

BACKGROUND OF THE INVENTION

Field of the Invention

The invention relates to a drive device having a driving machine that operates at a constant speed and is connected mechanically to a working machine via a variable-ratio gear unit which in turn is connected to a variable-ratio drive.

Such drive devices are required for working machines, the rotational speed of which is to be modified during operation.

Published, British Patent Application GB 1 305 393 A discloses a drive device which has a main drive machine which operates at a constant speed. This is connected to a working machine via a variable-ratio gear unit, which is connected to a variable-ratio drive. In each case, an alternating-current electric motor is provided as the main drive machine and as an auxiliary machine. Both are fed from the same current source.

The use of drive machines with different powers, which are fed from different voltage levels, is not possible here. The use of the drive device is therefore very restricted.

Published, European Patent Application EP 0 561 604 A1 describes the connection of a flywheel through a planetary gear unit. The flywheel is driven by a motor and used as the main drive machine. The auxiliary machine used is a servomotor or a hydrodynamic brake.

Japanese Patent Abstract No. 57047054 discloses a system having three adjustable-speed drive motors.

The publication VGB Kraftwerkstechnik [VGB Power Station Technology] 72 (1992), T. Weig and P. Boiger, pages 774 ff., describes a variable-speed drive for boiler feedwater pumps. A driving machine operating at a virtually constant rotational speed is connected to a working machine via a variable-ratio planetary gear unit. The variable-ratio planetary gear unit contains a ring gear with an outer and an inner toothing, one or more planet wheels, the toothings of which engage into the inner toothing of the ring gear, and a sun wheel, the toothing of which engages into that of the planet wheels. The shafts of the planet wheels are mounted on the planet carrier connected to the driving machine and rotate about the sun wheel that is connected to the output shaft. The toothings of the planet wheels and of the sun wheel likewise engage one in the other, thus resulting in rotation of the output shaft. In order to adjust the rotational speed of the working machine, the ring gear can be moved either in or opposite to the main drive direction, thereby achieving respectively a decrease and an increase in the output rotational speed, as compared with the stationary ring gear (nominal rotational speed). A closed hydrostatic circuit with axial piston machines is used for driving this variable-ratio planetary gear unit. An adjusting unit operating at a constant rotational speed and having a variable piston stroke determines the throughflow quantity of the fluid in the hydrostatic circuit, and consequently, the rotational speed of the constant unit having a uniform piston stroke. The constant unit operates as a motor in one direction of rotation or as a pump in the opposite direction and is connected to the outer toothing of the ring gear via a gear train. The adjusting unit is connected via a further gear train to the main drive shaft, from which the adjusting unit receives power when the output rotational speed rises beyond the nominal point or to which it returns power when the output rotational speed falls below the nominal point. In this configuration, the range of adjustment of the rotational speed is limited on account of the existing form of construction, thus restricting the possibility for using the working machine. A critical disadvantage, however, is that high efficiency of the drive system is achieved only at low variable-ratio rotational speeds, since the efficiency of the hydrostatic variable-ratio drive deteriorates rapidly with an increase in variable-ratio rotational speed. Moreover, the device as a whole has a complex configuration, with the result that it is relatively costly to construct.

SUMMARY OF THE INVENTION

It is accordingly an object of the invention to provide a drive device which overcomes the above-mentioned disadvantages of the prior art devices of this general type, by which a rotational speed of a working machine can be modified continuously and which, moreover, has a very simple and cost-effective configuration.

With the foregoing and other objects in view there is provided, in accordance with the invention, a drive device for driving a working machine, containing:

a variable-ratio gear unit including at least one planet wheel each having a toothing and a shaft, a carrier for supporting the at least one planet wheel and having a shaft, a sun wheel having a shaft and a toothing, and a ring gear having a rim provided with an inner toothing on an inside and an outer toothing on an outside, the toothing of the at least one planet wheel engages the inner toothing of the ring gear and the toothing of the sun wheel, and the shaft of the sun wheel is provided as an output to which the working machine can be connected mechanically;

at least one main driving machine operating at a constant speed and having a shaft connected to the carrier of the variable-ratio gear unit;

an electronically controlled variable-ratio drive having a frequency converter and an electric motor following the frequency converter, the electric motor has a shaft and a working pinion connected to the shaft, the working pinion is connected mechanically to the ring gear of the variable-ratio gear unit; and the shaft of the at least one planet wheel, the shaft of the carrier, the shaft of the sun wheel, and the shaft of the electric motor being oriented parallel to one another.

The variable-ratio gear unit of the drive device according to the invention is provided with at least one planet wheel, a carrier for the at least one planet wheel, a sun wheel and a ring gear, a rim of which has toothings on the inside and outside. Toothings of the planet wheels engage in the inner toothing of the ring gear and in the toothing of the sun wheel. Shafts of the planet wheels, the ring gear, the planet carriers and the sun wheel and that of the variable-ratio drive are oriented parallel to one another. The shaft of the sun wheel is used as an output and is connected mechanically to the working machine. This configuration is preferably used in high-speed working machines, of which the speed lies above the speed of the main drive machine. If the speed of the working machine is below that of the main drive machine, the shaft of the main drive machine is connected to the sun wheel. Accordingly, the shaft of the working machine is connected to the planet carrier. The variable-speed drive is controlled electronically. It has a frequency converter that is followed by an electric motor. A working pinion of the electric motor is connected mechanically to the ring gear of the variable-speed drive. The variable-speed variable-ratio drive transmits only relatively low power, depending on the size of the range of adjustment of the rotational speed and on the power characteristic of the working machine. Consequently, as compared with the power of the main drive, only a relatively small and therefore cost-effective frequency converter is necessary. According to the invention, a frequency converter with feedback may also be used. In this case, the output rotational speed may be both increased and decreased in relation to the configuration point, with the ring gear being stationary. In the latter case, the variable-ratio motor operates as a generator. Electrical power is then fed back into the network via the frequency converter.

In accordance with an added feature of the invention, a locking device for locking mechanically one of the carrier and the sun wheel is provided.

In accordance with an additional feature of the invention, a coupling is disposed between the working machine and the variable-ratio gear unit for separating the working machine from the variable-ratio gear unit.

In accordance with another feature of the invention, the frequency converter of the variable-ratio drive has an energy return.

In a variant of the drive device according to the invention, the shaft of the variable-ratio drive is provided with a second pinion that is used as a starting pinion. The latter is configured to be axially displaceable in the same way as the working pinion. The starting pinion can also be engaged into the toothing of a further gearwheel located on the main drive shaft. For this purpose, one or more spur gear stages can also be used, depending on the respective configuration requirements. An outer toothing of the planet carrier may also be used for this purpose. Furthermore, the starting pinion and the working pinion may be identical. In this embodiment of the invention, the motor of the variable-ratio drive may be used for the smooth starting of the main drive and of the working machine and, consequently, the starting motor may be dispensed with. During starting, the working pinion of the variable-ratio drive is not connected to the ring gear. During the starting operation, the ring gear is locked mechanically by a suitable locking device. After the main driving machine has reached a rotational speed to be predetermined, the starting pinion is released from the toothing on the main drive shaft and the supply of energy to the main drive is switched on. The starting pinion may also be disengaged after the supply of energy for the main drive has been switched on. After the disengagement of the starting pinion, the variable-ratio motor is stopped and the working pinion of the variable-ratio drive is engaged into the outer toothing of the stationary ring gear. After the locking of the ring gear has been released, variable-speed variable-ratio operation may commence. The switching operations necessary in the configuration described are therefore to be carried out when the corresponding toothings are at the same circumferential speed or at a standstill. This starting operation presupposes a working machine that is essentially relieved of load. If appropriate, a spur wheel stage may also be interposed. If this load relief is not possible, a suitable coupling must be provided between the output shaft of the drive system and the shaft of the working machine.

A further operating state is achieved if the main drive shaft is locked by a further braking or blocking configuration. In this case, variable-speed operation of the working machine at low power may then be carried out by driving the ring gear by the variable-ratio drive.

If the main driving machine used is an electric motor, this may be connected, together with the electrical variable-ratio drive, to a common alternating-voltage source, for example the electrical mains. The starting device described may also be used for electric main driving machines in the form of asynchronous machines that actually do without a starting motor. It makes it possible to have smaller dimensioning of the electrical wiring and switchgear, since high switch-on currents are avoided.

The drive device according to the invention has a compact configuration and can be assembled completely from standard components. It has high efficiency both under part load and under full load, since the components used all have high efficiencies that do not depend essentially on the rotational speed.

With the foregoing and other objects in view there is further provided, in accordance with the invention, a drive device for driving a working machine, containing:

a variable-ratio gear unit including at least one planet wheel having a shaft and a toothing, a carrier having a shaft and supporting the at least one planet wheel and the carrier is to be connected to the working machine, a sun wheel having a shaft and a toothing, and a ring gear having a rim formed with an inner toothing and an outer toothing, the toothing of the at least one planet wheel engaging the inner toothing of the ring gear and the toothing of the sun wheel;

at least one main driving machine operating at a constant speed and having a shaft connected mechanically to the shaft of the sun wheel;

an electronically controlled variable-ratio drive having a frequency converter, an electric motor following the frequency converter, and a shaft following the electric motor, and the variable-ratio drive connected mechanically to the variable-ratio gear unit; and the shaft of the at least one planet wheel, the shaft of the carrier, the shaft of the sun wheel, and the shaft of the variable-ratio drive are oriented parallel to one another.

Other features which are considered as characteristic for the invention are set forth in the appended claims.

Although the invention is illustrated and described herein as embodied in a drive device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
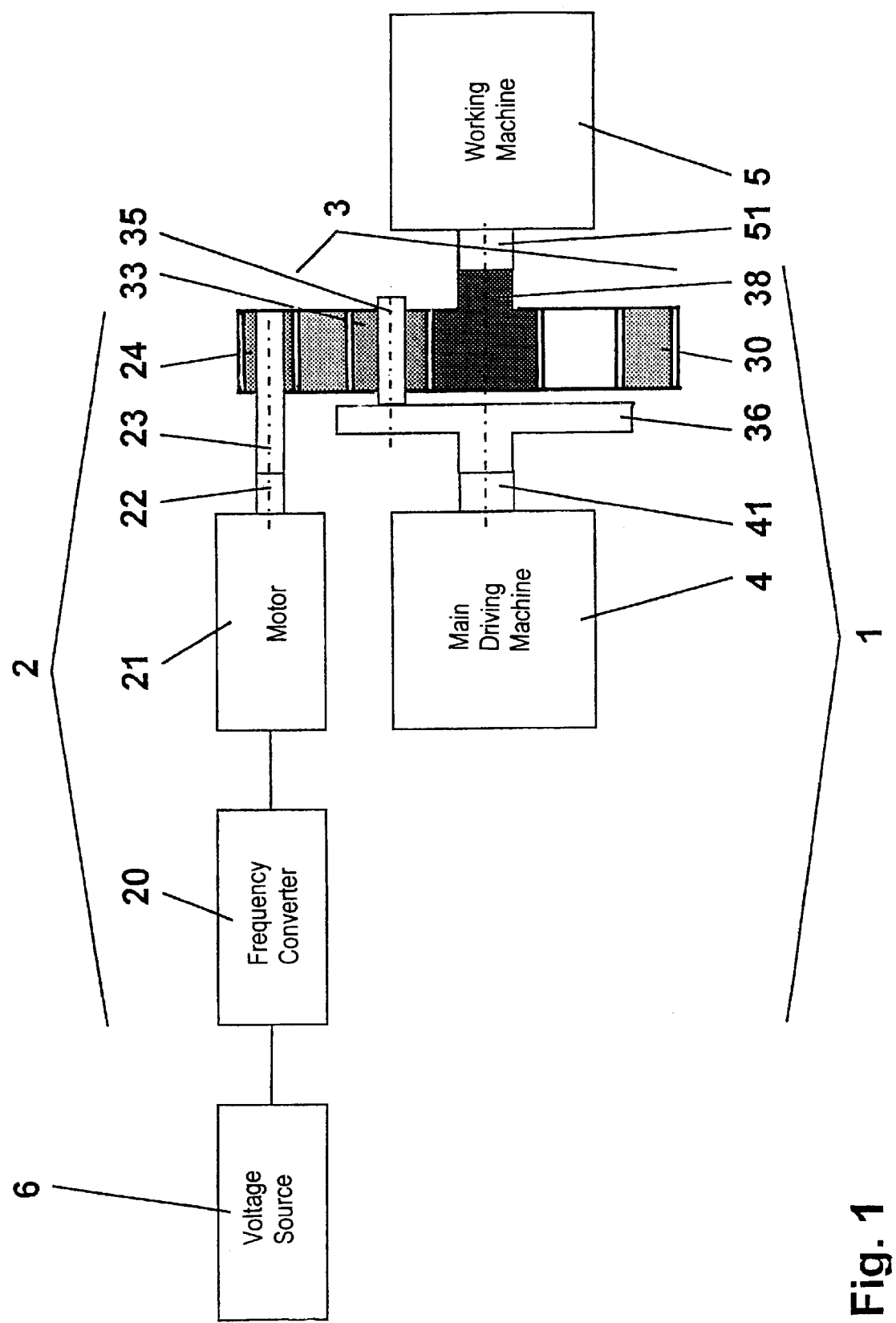
FIG. 1 a diagrammatic, illustration of a drive device according to the invention shown in part as a sectional view and in part as a block diagram.
Figure 2:
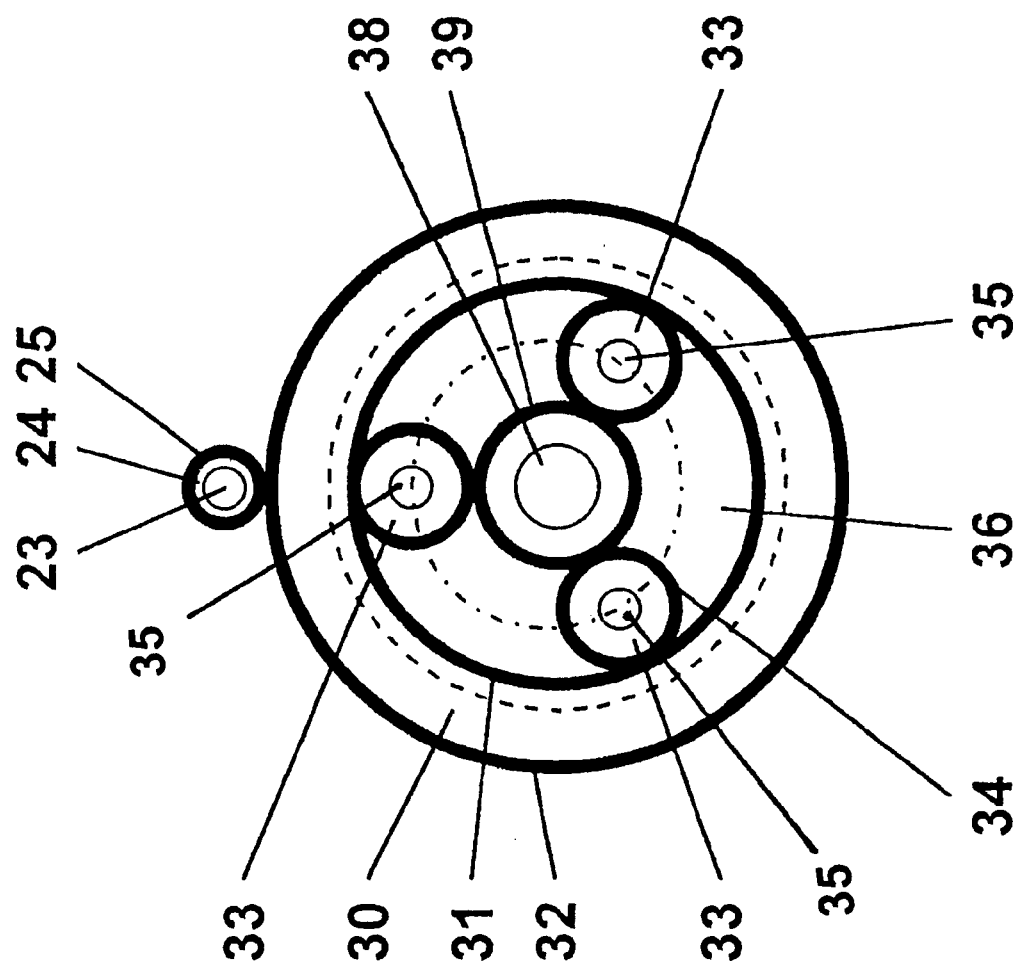
FIG. 2 is a side-elevational view of a variable-ratio gear unit, as seen in a direction of shafts of wheels.

In all the figures of the drawing, sub-features and integral parts that correspond to one another bear the same reference symbol in each case. Referring now to the figures of the drawing in detail and first, particularly, to FIG. 1 thereof, there is shown a drive device 1 that has, as its principal part, an electronically controlled variable ratio drive 2 and a variable-ratio planetary gear unit 3. Furthermore, the drive device 1 is assigned a main driving machine 4 and a working machine 5. In the exemplary embodiment illustrated here, the variable-ratio drive 2 consists of a frequency converter 20 that is followed by an electric motor 21. The frequency converter 20 may be configured with or without feedback (not illustrated here) and is connected to an alternating-voltage source 6. A shaft 22 of the electric motor 21 is connected mechanically to a shaft 23. The latter is provided with a working pinion 24 that serves for mechanical coupling to the variable-ratio gear unit 3. As may be seen from FIG. 2, the variable-ratio gear unit 3 has a ring gear 30 which, in the exemplary embodiment illustrated here, is provided with an inner toothing 31 and an outer toothing 32. The toothings 31 and 32 and all the toothings described below are illustrated in the figures merely diagrammatically in the form of a thickly drawn line. A toothing 25 of the working pinion 24 can engage into the outer toothing 32. At least one planet wheel 33 having a toothing 34 engages into the inner toothing 31 of the ring gear 30. In the exemplary embodiment illustrated here, three of the planet wheels 33 are provided. FIG. 1 shows that a planet carrier 36 is connected to a shaft 41 of the main driving machine 4. The planet wheels 33 are mounted on the planet carrier 36 by shafts 35. Furthermore, the toothings 34 of the planet wheels 33 engage into a toothing 39 of a sun wheel 38. A shaft of the sun wheel 38 serves as an output and is connected mechanically to the working machine 5. All the shafts of the drive device 1, containing the shaft 41 of the main drive 4, a shaft 80 of the planet carrier 36, the shafts 35 of the planet wheels 33 as well as the shafts 22, 23 of the variable-ratio drive 2 and an output shaft 81 of the sun wheel 38, can run parallel to one another.

An electric motor, but also any desired driving machine, may be used as the main driving machine 4. If an electric motor is used, it may be connected to the same alternating-voltage source 6 as the frequency converter 20, if appropriate with a transformer (not illustrated here) being interposed. A transformer (not illustrated here) may also be interposed between the alternating-voltage source 6 and the frequency converter 20.

Figure 3:
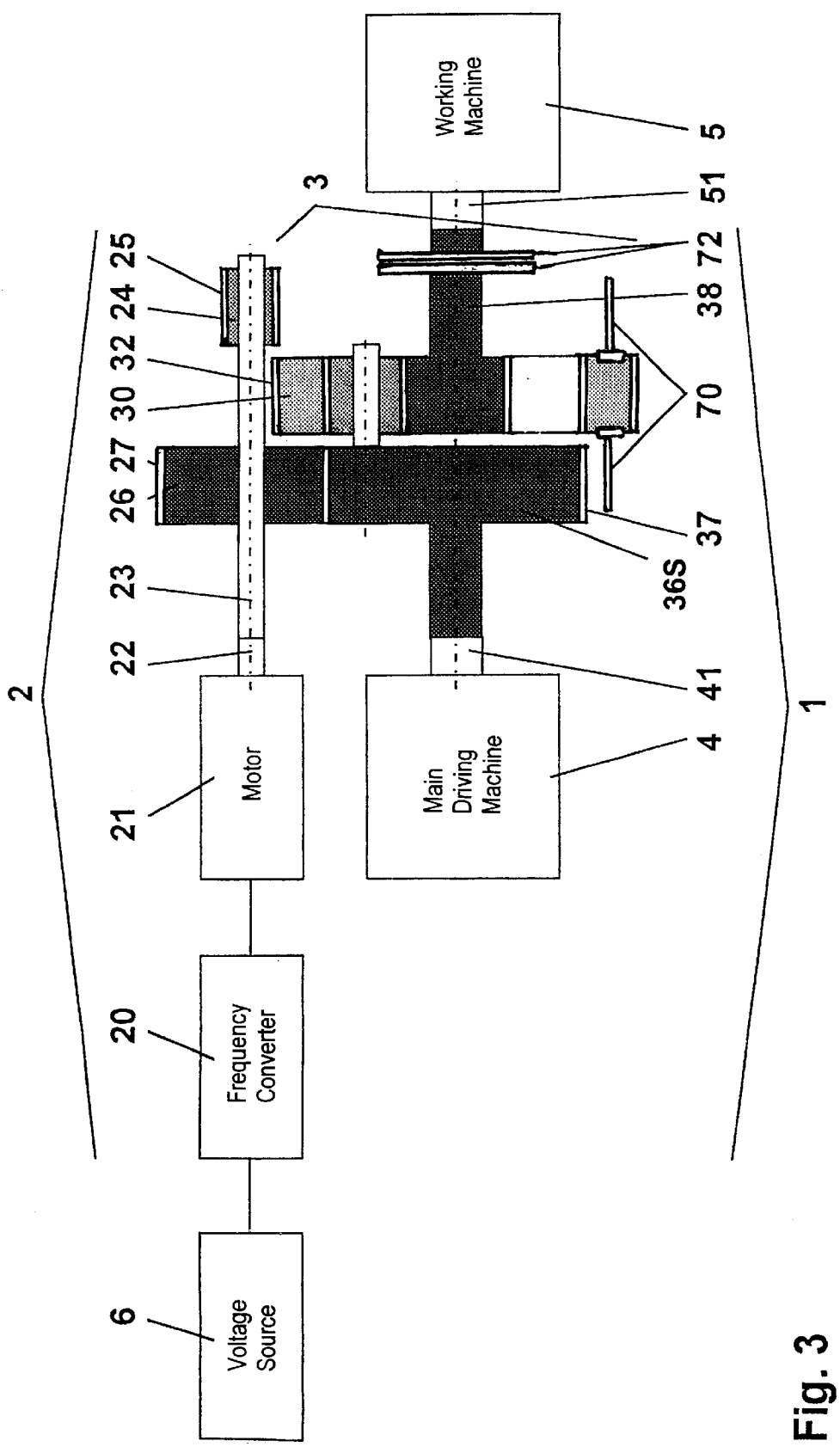
FIG. 3 is an illustration of a second embodiment of the drive device illustrated in FIG. 1 shown in part as a sectional view and in part as a block diagram.

The drive device 1 shown in FIG. 3 is essentially identical in terms of construction to the drive device 1 illustrated in FIG. 1 and explained in the accompanying description. Identical structural elements are therefore given the same reference symbols. The difference is that the shaft 23 of the variable-ratio drive 2 is additionally provided with a starting pinion 26. Furthermore, a brake 70 is provided, by which the ring gear 30 can be locked. It is consequently possible to use the variable-ratio drive 2 for starting the main driving machine 4. A spur wheel 36S connected to the drive shaft 41 is necessary for this purpose. In the exemplary embodiment illustrated here, the spur wheel 36S serves at the same time as a carrier for the planet wheels 33. Its dimensions are such that it can be brought into contact with the starting pinion 26.

In addition, it is provided on the outside with a toothing 37, into which the toothing 27 of the starting pinion 26 can engage. During starting, there is no contact between the working pinion 24 and the ring gear 30. When the main driving machine 4 has been set in motion, the starting pinion 26 is disengaged and the toothing 25 of the working pinion 24 engages into the outer toothing 32 of the ring gear 30. According to the invention, there is the possibility of also using the working pinion 24 as a starting pinion. If the working machine 5 cannot be sufficiently relieved of load, it can be separated from the drive device 1 by a coupling 72 during the starting operation. The coupling 72 is installed between the output shaft 38 of the drive device 1 and a shaft 51 of the working machine 5.

Figure 4:
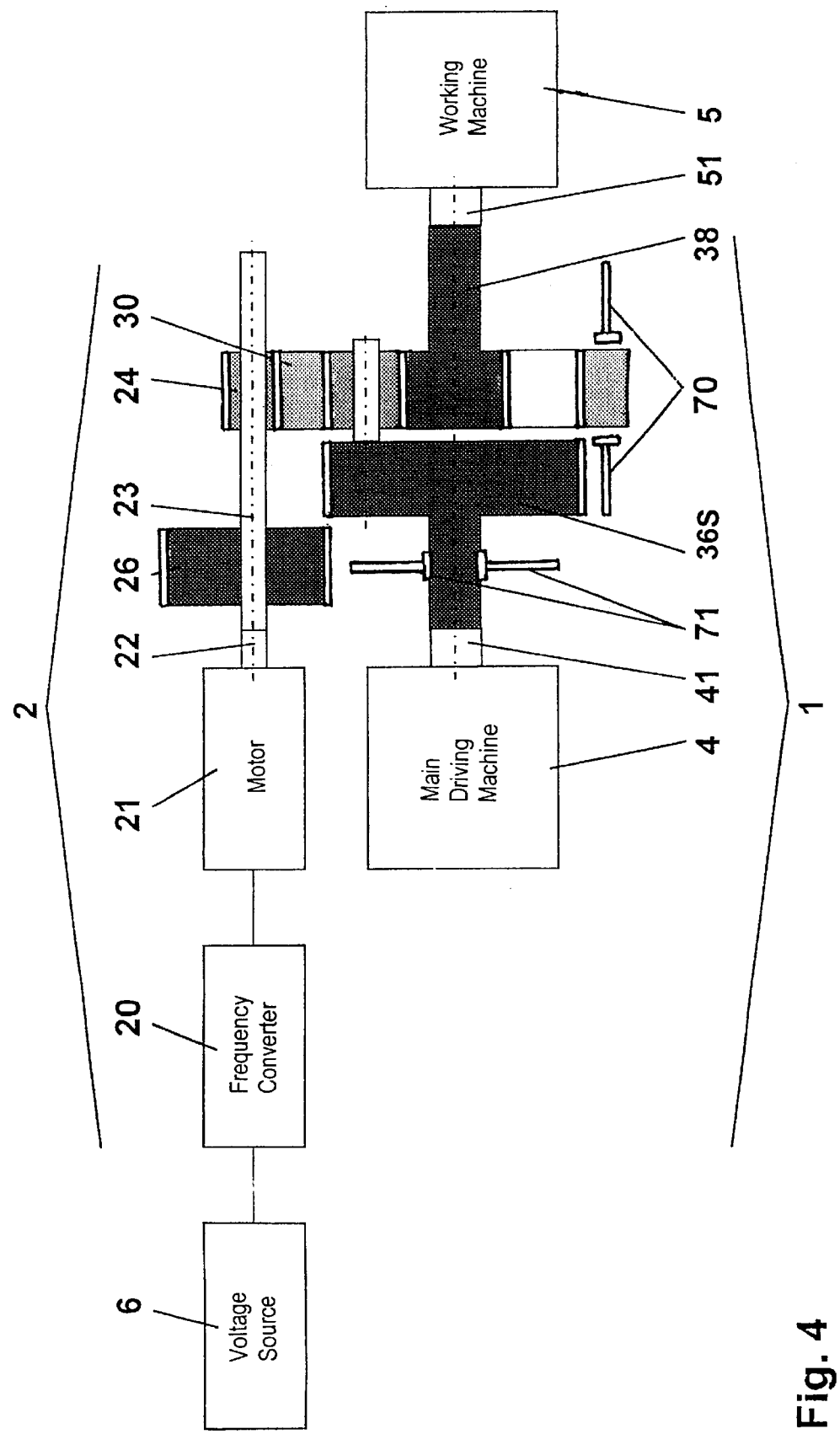
FIG. 4 is an illustration of a third embodiment of the drive device illustrated in FIG. 1 shown in part as a sectional view and in part as a block diagram.

The drive device 1 as shown in FIG. 4 is essentially identical in terms of construction to the drive device 1 illustrated in FIG. 3 and explained in the accompanying description. The difference is that this drive device 1 can be used for variable-speed light-load operation. For this purpose, the starting pinion 26 is disengaged and the working pinion 24 is in contact with the ring gear 30. The locking device 70 of the ring gear 30 is released, while the shaft of the carrier 36S for the planet wheels 33 is retained by a locking device 71. However, if the main driving machine 4 is connected to the sun wheel 38, the locking device 71 acts on the shaft of the sun wheel 38.

Figure 5:
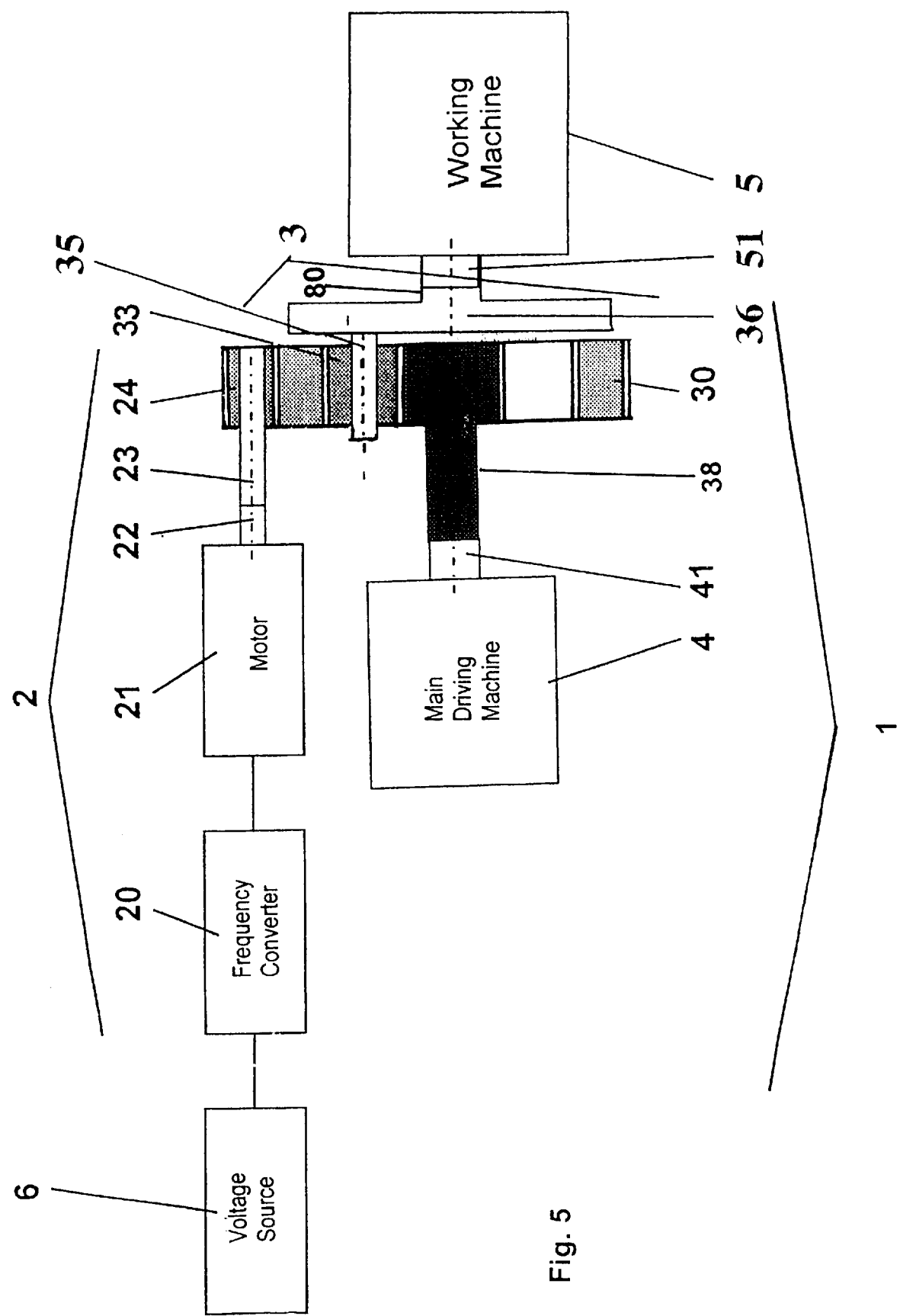
FIG. 5 is an illustration of a fourth embodiment of the drive device shown in part as a sectional view and in part as a block diagram.

FIG. 5 shows a fourth embodiment of the drive device 1. FIG. 5 is similar to FIG. 1 except that the planet carrier 36 is now connected to the working machine 5 instead of the main driving machine 4 and drives the planet wheel(s) 33. Also in contrast to FIG. 1, the main driving machine 4 is now connected to the sun wheel 38.

I claim:

1. A drive device for driving a working machine, comprising:

a variable-ratio gear unit including at least one planet wheel each having a toothing and a shaft, a carrier for supporting said at least one planet wheel and having a shaft, a sun wheel having a shaft and a toothing, and a ring gear having a rim provided with an inner toothing on an inside and an outer toothing on an outside, said toothing of said at least one planet wheel engaging in said inner toothing of said ring gear and in said toothing of said sun wheel, and said shaft of said sun wheel provided as an output to which the working machine can be connected mechanically;

at least one main driving machine operating at a constant speed and having a shaft connected to said carrier of said variable-ratio gear unit; and an electronically controlled variable-ratio drive having a frequency converter and an electric motor following said frequency converter, said electric motor having a shaft and a working pinion connected to said shaft of said electric motor, said working pinion connected mechanically to said ring gear of said variable-ratio gear unit;

said shaft of said at least one planet wheel, said shaft of said carrier, said shaft of said sun wheel, and said shaft of said electric motor being oriented parallel to one another.

2. The drive device according to claim 1, wherein said carrier is a spur wheel, and said shaft of said electric motor of said variable-ratio drive has a starting pinion for engaging said toothing of said spur wheel.

3. The drive device according to claim 1, wherein said working pinion can also be used as a starting pinion engaging in said toothing of said carrier.

4. The drive device according to claim 1, including a locking device for locking mechanically said ring gear.

5. The drive device according to claim 1, including a locking device for locking mechanically one of said carrier and said sun wheel.

6. The drive device according to claim 1, including a coupling disposed between the working machine and said variable-ratio gear unit for separating the working machine from said variable-ratio gear unit.

7. The drive device according to claim 1, wherein said frequency converter of said variable-ratio drive has an energy return.

\* \* \* \* \*